US008960657B2

(12) United States Patent
Albrecht

(10) Patent No.: US 8,960,657 B2
(45) Date of Patent: Feb. 24, 2015

(54) SYSTEMS AND METHODS FOR CONNECTING AN INGOT TO A WIRE SAW

(75) Inventor: Peter D. Albrecht, O'Fallon, MO (US)

(73) Assignee: SunEdison, Inc., St. Peters, MI (US)

(*) Notice: Subject to any disclaimer, the term of this patent is extended or adjusted under 35 U.S.C. 154(b) by 765 days.

(21) Appl. No.: 13/253,509

(22) Filed: Oct. 5, 2011

(65) Prior Publication Data
US 2013/0087132 A1 Apr. 11, 2013

(51) Int. Cl.
B28D 7/04 (2006.01)
B28D 5/00 (2006.01)
B23D 57/00 (2006.01)
F16B 37/04 (2006.01)

(52) U.S. Cl.
CPC .......... *B28D 5/0082* (2013.01); *B23D 57/0046* (2013.01); *F16B 37/045* (2013.01)
USPC ............................................. 269/291; 125/35

(58) Field of Classification Search
USPC ................................. 269/291, 309; 125/12, 35
See application file for complete search history.

(56) References Cited

U.S. PATENT DOCUMENTS

| | | | |
|---|---|---|---|
| 3,180,636 A * | 4/1965 | Carpenter | 269/224 |
| 4,949,700 A * | 8/1990 | Ebashi | 125/13.01 |
| 4,957,402 A | 9/1990 | Klein et al. | |
| 5,356,488 A | 10/1994 | Hezel | |
| 5,398,857 A | 3/1995 | Shinozaki et al. | |
| 5,449,626 A | 9/1995 | Hezel | |
| 5,465,892 A | 11/1995 | Shinozaki et al. | |
| 5,469,200 A | 11/1995 | Terai | |
| 5,551,618 A | 9/1996 | Shinozaki et al. | |
| 5,661,503 A | 8/1997 | Terai | |
| 5,738,731 A | 4/1998 | Shindo et al. | |
| 5,809,986 A | 9/1998 | Katamachi | |
| 5,857,454 A * | 1/1999 | Shibaoka | 125/16.02 |
| 5,904,136 A * | 5/1999 | Nagatsuka et al. | 125/16.02 |
| 5,908,025 A | 6/1999 | Katamachi | |
| 5,950,643 A | 9/1999 | Miyazaki et al. | |
| 5,961,944 A | 10/1999 | Aratani et al. | |
| 6,025,252 A | 2/2000 | Shindo et al. | |
| 6,106,734 A | 8/2000 | Shindo et al. | |
| 6,135,103 A | 10/2000 | Katamachi | |
| 6,137,120 A | 10/2000 | Shindo et al. | |
| 6,139,591 A | 10/2000 | Nakaura et al. | |

(Continued)

FOREIGN PATENT DOCUMENTS

DE 102009023119 A1 11/2010
EP 0841492 A1 5/1998

(Continued)

OTHER PUBLICATIONS

PCT International Search Report and Written Opinion of the International Searching Authority mailed on Dec. 7, 2012 regarding PCT/US2012/057614 filed on Sep. 27, 2012; 10 pgs.

*Primary Examiner* — Lee D Wilson
*Assistant Examiner* — Henry Hong
(74) *Attorney, Agent, or Firm* — Armstrong Teasdale LLP

(57) ABSTRACT

Systems and methods are disclosed for connecting an ingot to a wire saw with an ingot holder, a bond beam, and a bar. The bar has an angled mating surface that engages a recessed surface formed in a slot of the bond beam. Mechanical fasteners are used to connect the tee bar to the ingot holder. The angle of the mating surface with respect to the recessed surface of the slot prevents deformation of the bond beam and prevents compromising the integrity of the adhesive bond between the ingot and the bond beam.

9 Claims, 11 Drawing Sheets

(56) References Cited

U.S. PATENT DOCUMENTS

| | | | |
|---|---|---|---|
| 6,145,422 A * | 11/2000 | Katamachi et al. | 83/74 |
| 6,177,706 B1 | 1/2001 | Shindo et al. | |
| 6,225,668 B1 | 5/2001 | Shindo et al. | |
| 6,468,923 B1 | 10/2002 | Yonehara et al. | |
| 6,576,831 B2 | 6/2003 | Woditsch et al. | |
| 6,656,271 B2 | 12/2003 | Yonehara et al. | |
| 6,660,643 B1 | 12/2003 | Kardauskas et al. | |
| 6,677,214 B1 | 1/2004 | Shindo et al. | |
| 6,941,940 B1 * | 9/2005 | Zavattari et al. | 125/16.02 |
| 7,025,665 B2 | 4/2006 | Bender | |
| 7,271,888 B2 | 9/2007 | Frodis et al. | |
| 7,294,779 B2 | 11/2007 | Watabe et al. | |
| 7,314,517 B2 | 1/2008 | Dwilinski et al. | |
| 7,351,282 B2 | 4/2008 | Yamaguchi | |
| 7,368,015 B2 | 5/2008 | D'Evelyn et al. | |
| 7,387,677 B2 | 6/2008 | Dwilinski et al. | |
| 7,410,539 B2 | 8/2008 | Dwilinski et al. | |
| 7,456,104 B2 | 11/2008 | Kusumoto et al. | |
| 7,485,900 B2 | 2/2009 | Nonaka et al. | |
| 7,512,297 B2 | 3/2009 | Farah | |
| 7,588,674 B2 | 9/2009 | Frodis et al. | |
| 7,638,815 B2 | 12/2009 | D'Evelyn et al. | |
| 7,700,535 B1 | 4/2010 | Ward | |
| 7,727,874 B2 | 6/2010 | Hanser et al. | |
| 7,728,383 B2 | 6/2010 | Kusumoto et al. | |
| 7,763,146 B2 | 7/2010 | Eguchi | |
| 7,786,503 B2 | 8/2010 | D'Evelyn et al. | |
| 7,793,647 B2 | 9/2010 | Skovgaard-Soerensen | |
| 7,811,380 B2 | 10/2010 | Dwilinski et al. | |
| 7,827,980 B2 | 11/2010 | Skovgaard-Soerensen et al. | |
| 7,859,008 B2 | 12/2010 | D'Evelyn et al. | |
| 8,181,949 B2 * | 5/2012 | Hung | 269/244 |
| 2011/0100348 A1 * | 5/2011 | Bucher et al. | 125/21 |

FOREIGN PATENT DOCUMENTS

| | | |
|---|---|---|
| EP | 2111960 A1 | 10/2009 |
| FR | 2580689 A1 | 10/1986 |

* cited by examiner

US 8,960,657 B2

SYSTEMS AND METHODS FOR CONNECTING AN INGOT TO A WIRE SAW

FIELD

This disclosure relates generally to wire saws used to slice ingots into wafers and, more specifically, to systems used to connect an ingot to the wire saw.

BACKGROUND

Wire saw machines are used, for example, to slice ingots into wafers. These ingots are typically made of silicon or other semiconductor or solar grade material. The ingot is connected to structure of the wire saw by a bond beam and an ingot holder. The ingot is bonded with adhesive to the bond beam, and the bond beam is in turn bonded with adhesive to the ingot holder. The ingot holder is connected by any suitable fastening system to the wire saw structure.

In operation, the ingot is contacted by a web of moving wires in the wire saw that slice the ingot into a plurality of wafers. The wires initially contact the ingot on a periphery of the ingot opposite the bond beam and then slice through the ingot towards the bond beam to form the wafers. The wires may contact the bond beam after slicing through the ingot. The wafers typically remain attached to the bond beam after completion of the slicing operation. The ingot holder, bond beam, and wafers are then removed from the wire saw. The wafers are separated from the bond beam and subjected to wafering processes. The bond beam must then be removed from the ingot holder before the holder is returned to service. Because the bond beam and holder are bonded together with adhesive, separating them is often time-consuming and costly.

Previous attempts to use mechanisms other than adhesive to connect the bond beam to the ingot holder have not yielded satisfactory results. Thus, there exists a need for a more efficient and effective system to connect the bond beam to the ingot holder.

This section is intended to introduce the reader to various aspects of art that may be related to various aspects of the disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

SUMMARY

In one aspect, a system for connecting an ingot to a rail of a wire saw machine is disclosed and comprises an ingot holder, a bond beam, and a bar. The ingot holder is connected to the rail of the wire saw machine and to the bond beam. The bond beam has a first surface and an opposing second surface. The first surface is connected to the ingot holder and has a slot formed therein. A pair of protrusions are positioned adjacent the slot and the slot has an upward-facing recessed surface. The second surface is connected to the ingot. The bar is disposed between the bond beam and the ingot holder. The bar has a mating surface engaging the recessed surface of the slot and the mating surface is angled between about 5 degrees and about 10 degrees relative to the recessed surface when the bar is positioned within the slot. The engagement of the recessed surface by the angled mating surface prevents deflection of the protrusions and the second surface.

In another aspect, a bar for use in a wire saw configured to slice an ingot into wafers is disclosed. The wire saw has an ingot holder configured for connection to the wire saw and a bond beam having a first surface configured for connection to the ingot holder and a second surface configured for connection to the ingot. The bar comprises an upper surface, a lower surface, and a mating surface for engaging a recessed surface in a slot formed in the first surface of the bond beam. The mating surface is disposed in a first plane and the recessed surface is disposed in a second plane. The first plane intersects the second plane when the bar is positioned in the slot.

In yet another aspect, a method for connecting an ingot to a wire saw using an ingot holder, a bond beam, and a bar. The method comprises bonding an ingot to a second surface of the bond beam. The bar is then positioned within a slot formed in the bond beam. The bar has a mating surface that is angled between about 5 degrees and about 10 degrees relative to a upward-facing recessed surface in the slot when the bar is positioned within the slot. A pair of protrusions is formed in the bond beam against the slot. A mechanical fastener is inserted through a coextensive opening formed in the ingot holder and the bar. The fastener is tightened, wherein tightening the fastener results in engagement of the angled mating surface against the recessed surface in the slot and connects the ingot holder to the bond beam and the ingot. Engagement of the angled mating surface against the recessed surface prevents deformation of the protrusions and the second surface of the bond beam. The ingot holder is then connected to the wire saw and connection of the ingot holder to the wire saw results in connection of the ingot to the wire saw.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION OF THE INVENTION

Figure 1:
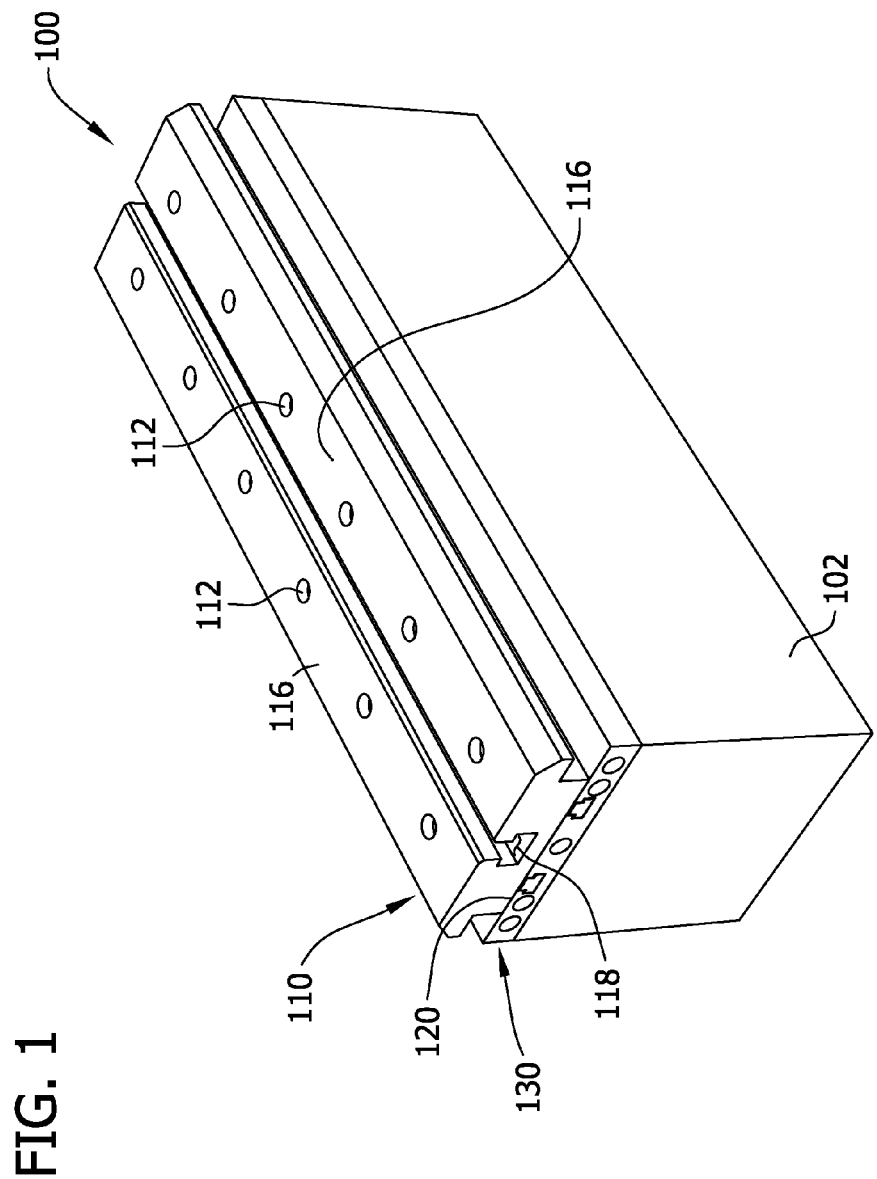
FIG. 1 is a perspective view of a silicon ingot and a system for connecting the ingot to a wire saw.

Referring to the drawings, an exemplary system for connecting a silicon ingot 102 to a wire saw 103 is shown in FIG.

Figure 2:
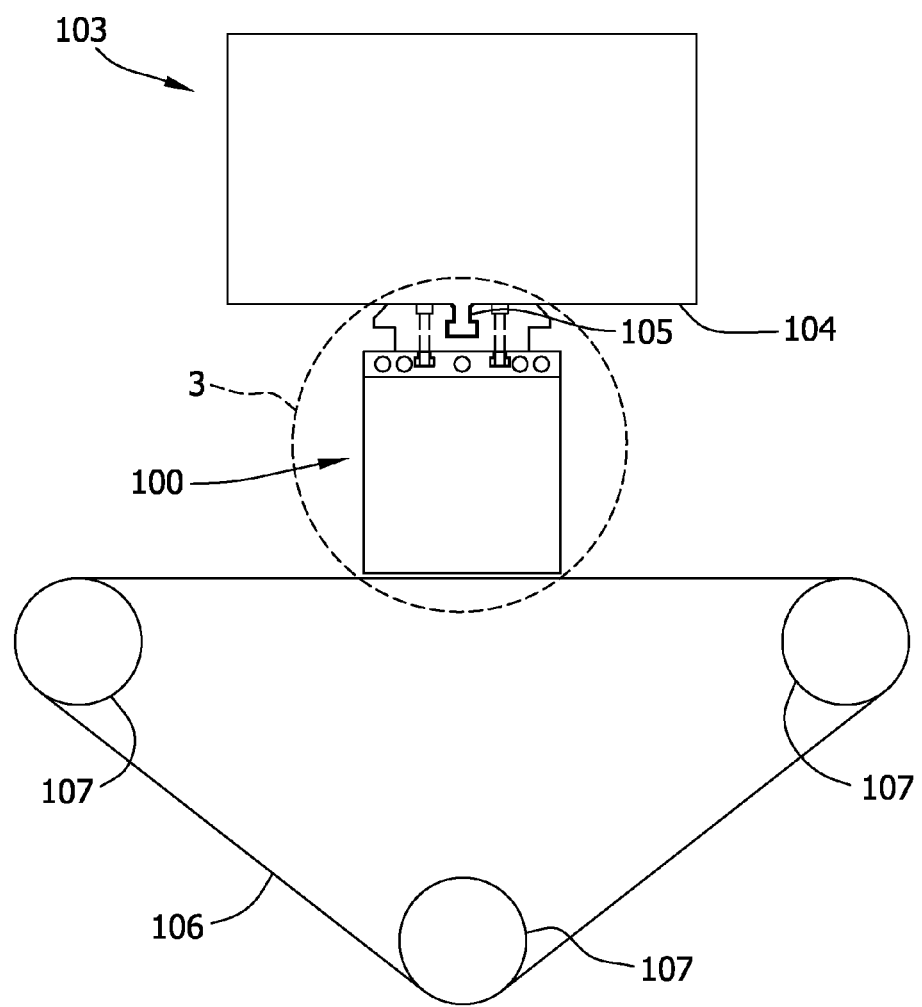
FIG. 2 is an end view of the ingot and system of FIG. 1 positioned in a wire saw.

1 and indicated generally at 100. The wire saw 103 (i.e., a wire saw machine) is shown in greater detail in FIG. 2 and is of the type used to saw the ingot 102 into wafers with a web of wires 106. The web of wires 106 (one of which is shown in the end view of FIG. 2) travel along a circuitous path around three rollers 107 when slicing the ingot 102. As shown in FIG. 2, the system 100 is connected to the wire saw 103 by a rail 105, which is in turn connected to a structure 104 of the wire saw. The wire saw 103 may be used to manufacture photovoltaic devices, among other possible uses.

Figure 3:
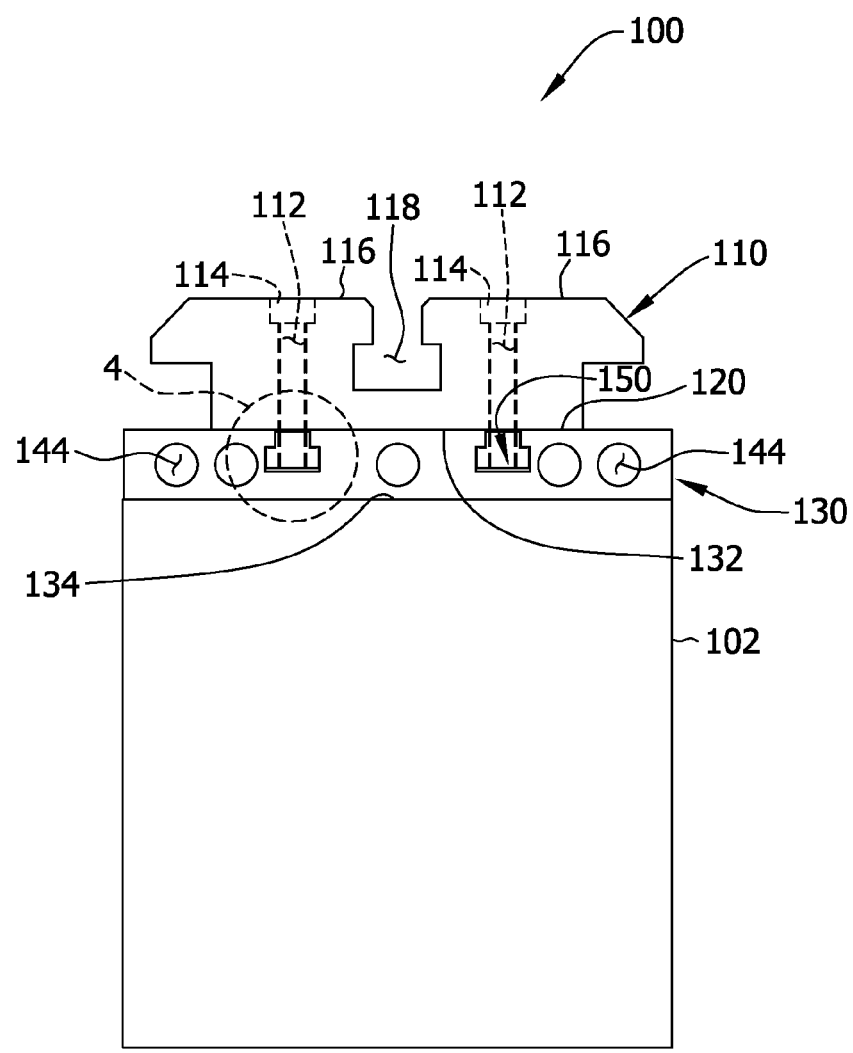
FIG. 3 is an enlarged view of the ingot and system of FIG. 2.

As shown in FIGS. 1 and 3, the system 100 generally comprises an ingot holder 110 (broadly, a "holder" or a "clamping rail"), a bond beam 130, and a tee bar 150 (collectively, the "components" of the system), each of which is discussed below in greater detail. The tee bar 150 is best seen in FIGS. 4-7 and is broadly referred to as a "bar". The ingot holder 110 is affixed to the structure 104 of the wire saw 103 by the rail 105 during use of the saw to slice the ingot 102 into wafers. The ingot holder 110 has a length that is substantially equal to the length of the ingot 102, the bond beam 130, and the tee bar 150. In other embodiments, the length of the ingot holder 110 may differ from the ingot 102 and the other components of the system 100.

The ingot holder 110 has a plurality of openings 112 formed therein, as shown in FIGS. 1 and 3. These openings 112 are sized to receive mechanical fasteners (e.g., bolts, socket head cap screws, etc.) therein. Two rows of six openings 112 are shown in FIG. 1, although other embodiments may use different numbers or configurations of openings. In the example embodiment, the openings each have a countersunk portion 114 (FIG. 3) sized to receive a head of the fastener. The countersunk portion 114 results in the head of the fastener being flush with and not protruding above an upper surface 116 of the ingot holder 110.

In the example embodiment, the ingot holder 110 has a channel 118 formed into the upper surface 116 therein that is sized to receive the rail 105 of the wire saw 103. The ingot holder 110 is thus operable to slide into and out of the wire saw along the rail 105. Accordingly, the other components of the system 100 connected to the ingot holder 110 are also able to be slid into and out of the wire saw 103. In other embodiments any suitable fastening system (e.g., mechanical fasteners) can be used to connect the ingot holder 110 to the wire saw 103.

Figure 4:
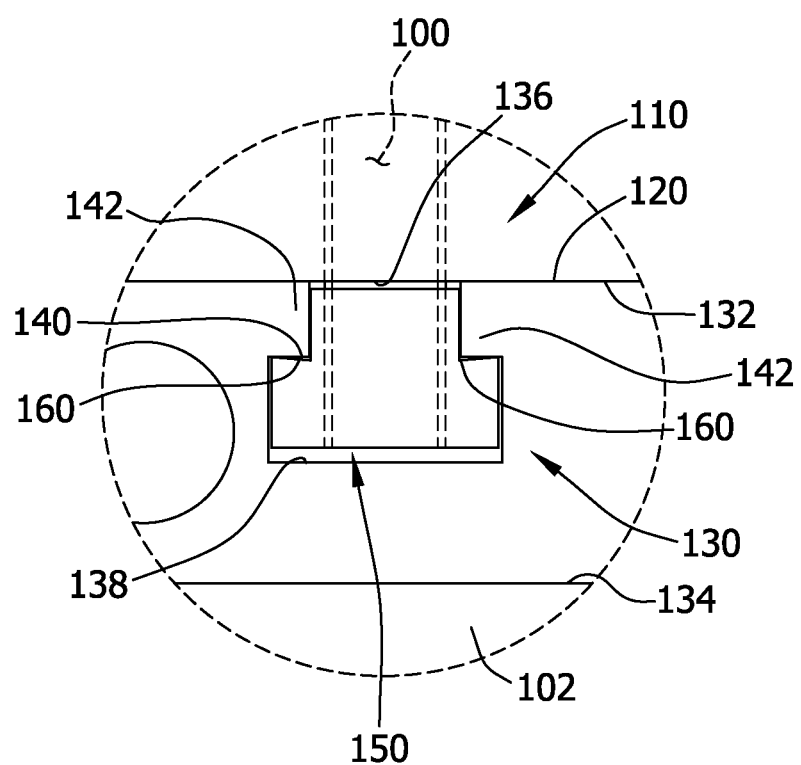
FIG. 4 is an enlarged view of a portion of the silicon ingot and system of FIG. 3.
Figure 5:
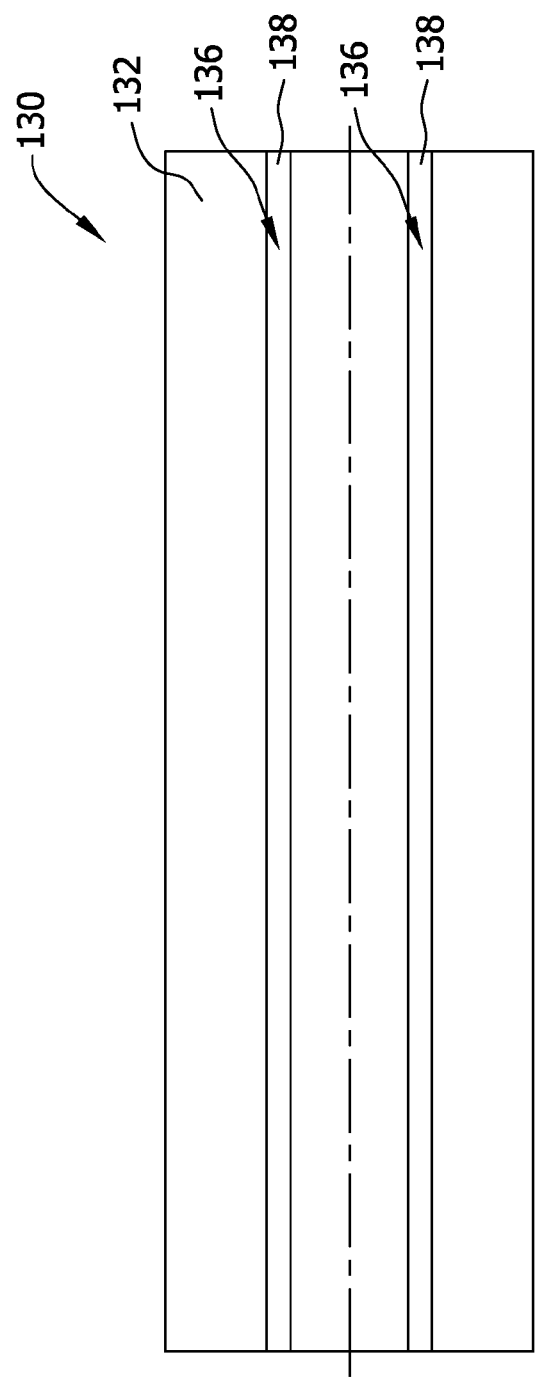
FIG. 5 is a top plan view of a bond beam used in the system of FIG. 1.

The bond beam 130, as shown in FIGS. 3-5, has a first surface 132 positioned adjacent a lower surface 120 of the ingot holder 110. The bond beam 130 has a second surface 134 opposing the first surface 132 and configured for connection to the silicon ingot 102. In the example embodiment, adhesive is used to connect the silicon ingot 102 to the second surface 134. To ensure a proper bond between the second surface 134 and the ingot 102, the second surface is preferably flat. In some embodiments, the flatness of the second surface can be up to about 0.15 mm (as measured with a straight edge and feeler gages).

Two slots 136 are formed in the first surface 132 of the bond beam 130 and each has a lower surface 138 and an upward-facing recessed surface 140. Reference is made herein to one of the slots 136, although it should be understood that each of the slots have the same or similar features. Moreover, different numbers of slots 136 may be used without departing from the scope of the embodiments.

The bond beam 130 also includes two protrusions 142 positioned vertically above the slot 136 and function to restrain the tee bar 150 from moving vertically through the slot. The lower surface 138 and the recessed surface 140 are spaced apart a distance to permit the tee bar 150 to be positioned between the two. The distance is large enough to allow for sufficient clearance between the surfaces 138, 140 and the tee bar 150 to ease installation of the tee bar. The lower surface 138 and the recessed surface 140 are parallel in the example embodiment, although in other embodiments they may lie in intersecting planes that intersect at angle of between 2 and 20 degrees.

In the example embodiment, the bond beam 130 has a plurality of cleaning lance openings 144, although other embodiments may not use such openings. The lance openings 144 can be used in a cleaning operation following slicing of the ingot 102. During use, the wires 106 of the saw 103 may contact the bond beam 130 after slicing the ingot 102 into wafers in order to ensure that the ingot has been completely sliced into wafers. The bond beam 130 is formed from a material that is easily sawn by the wire saw 103 during slicing of the ingot 102 into wafers without damaging the wires 106 of the saw. Examples of such materials include epoxy, glass, and other resins.

Figure 6:
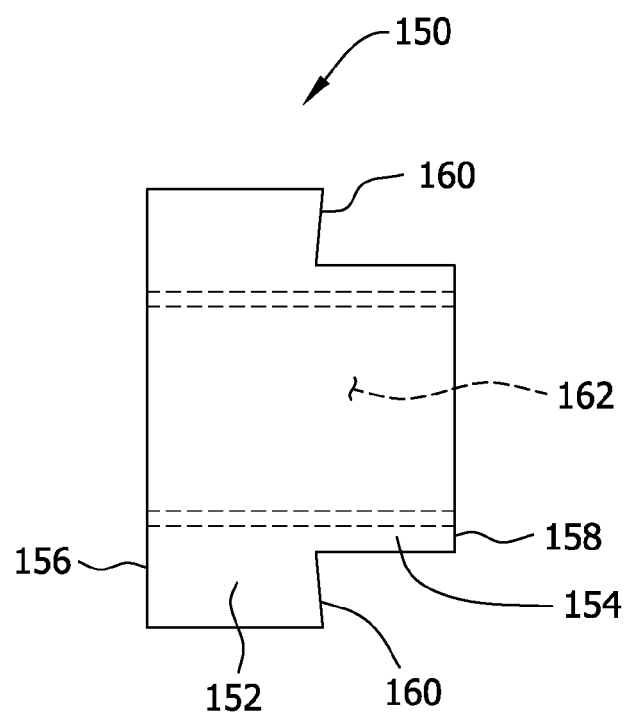
FIG. 6 is an end view of a tee bar used in the system of FIG. 1.
Figure 7:
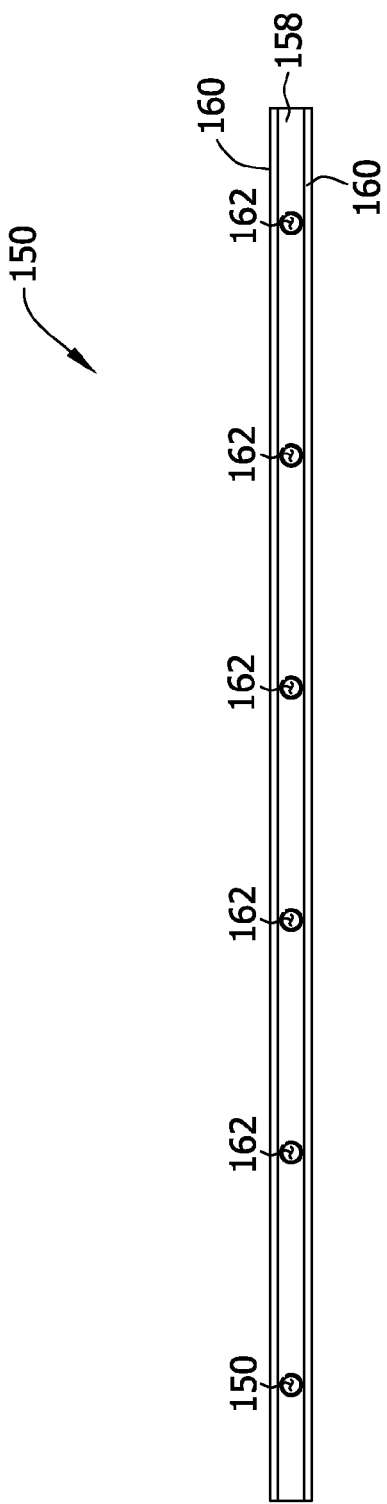
FIG. 7 is a top plan view of the tee bar of FIG. 5.

The tee bar 150, best seen in FIGS. 4, 6, and 7, is provided for connecting the bond beam 130 to the ingot holder 110. The tee bar 150 has a first portion 152 and a second portion 154. A lower surface 156 of the tee bar 150 is disposed in the first portion 152 while an upper surface 158 of the tee bar is disposed in the second portion 154. The width of the first portion 152 is greater than the width of the second portion 154, and hence the tee bar is shaped similar to the letter "T". Bars having other shapes, as described below, can also be used.

A pair of mating surfaces 160 form the uppermost section of the first portion 152, as shown in FIG. 6. The mating surfaces 160 are each disposed in a plane that intersects a plane in which the lower surface 156 of the tee bar 150 is disposed. These planes intersect at an angle of between about 2 degrees and 20 degrees, or between about 5 degrees and 10 degrees. Moreover, as shown in FIG. 3, the mating surfaces 160 are also disposed at an angle relative to the recessed surfaces 140 of the slot 136 when the tee bar 150 is positioned within the slot. This angle between the mating surfaces 160 and the recessed surfaces 140 is between about 2 degrees and 20 degrees, or between about 5 degrees and 10 degrees. The effects and benefits of this angling of the mating surfaces 160 with respect to the recessed surfaces 140 are discussed in greater detail below.

As shown in FIG. 7, the tee bar 150 has a plurality of openings 162 formed therein which are sized to receive mechanical fasteners. In the example embodiment, the openings 162 are threaded and thus configured to receive threaded mechanical fasteners. The openings 162 also penetrate through both the upper surface 158 and the lower surface 156 of the tee bar 150. In other embodiments, the openings 162 may not penetrate through the lower surface 156 of the tee bar 150 (i.e., the openings are blind holes). The openings 162 are spaced along the length of the tee bar 150 such that when the tee bar is in use the openings 162 are coextensive with the openings 112 formed in the ingot holder 110.

In operation, the ingot 102 may first be adhesively bonded or otherwise attached to the second surface 134 of the bond beam 130. In other embodiments, the ingot 102 is adhesively bonded or otherwise attached to the second surface 134 of the bond beam 130 at a later point in time.

The tee bar 150 is placed within the slot 136 formed in the bond beam 130. Mechanical fasteners are then inserted through the openings 112 in the ingot holder 110 and into the openings 162 in the tee bar 150. The fasteners are then rotated to tighten the fasteners, which pulls the tee bar 150 upwards towards the ingot holder 110. This upward movement brings the mating surfaces 160 of the tee bar 150 into contact and engagement with the recessed surfaces 140 of the slot 136, as shown in FIG. 3. When in this position, the tee bar 150 connects the bond beam 130 to the ingot holder 110, and in turn the ingot 102 to the ingot holder. The ingot holder 110 may then be slid along the rail 105 or otherwise positioned in the wire saw 103. The wire saw 103 is then used to slice the ingot 102 into wafers. After completion of the slicing operation, the ingot holder 110 is removed from the wire saw 103 and the fasteners are loosened to permit removal of the bond beam 130 and the wafers from the ingot holder. The ingot holder 110 may then be returned to service. The wafers are then removed from the bond beam 130.

Figure 8:
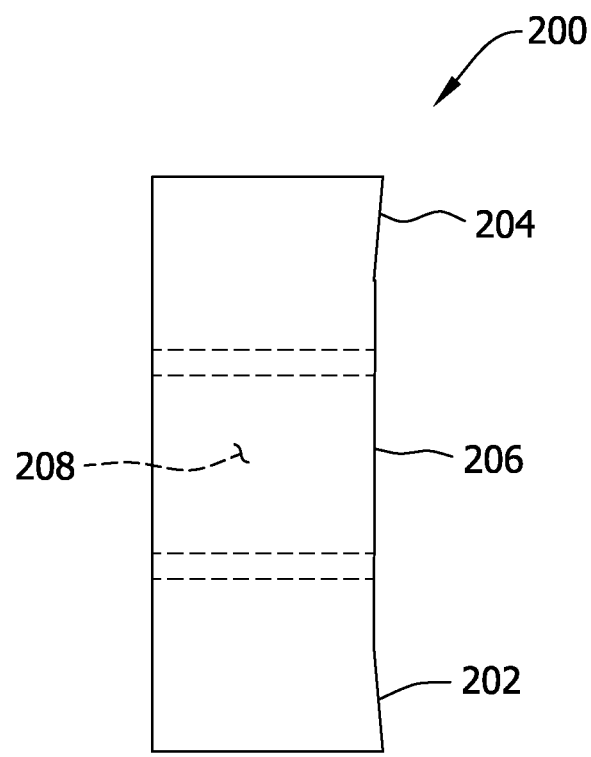
FIG. 8 is an end view of another embodiment of a bar used in the system of FIG. 1.
Figure 9:
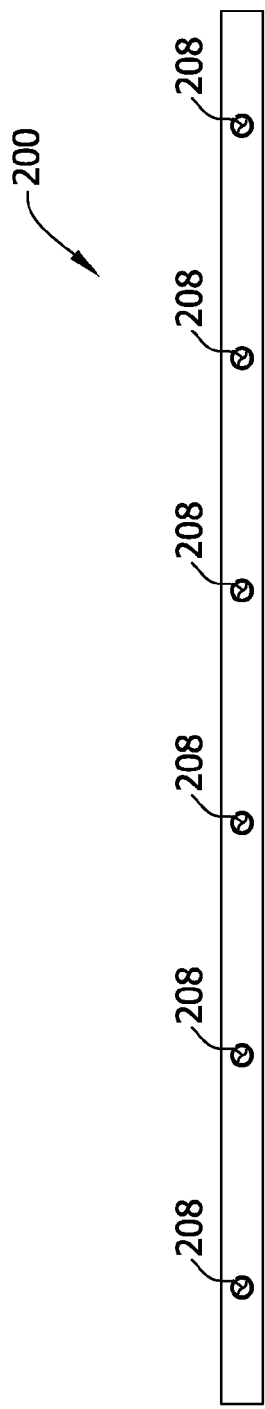
FIG. 9 is a top plan view of the bar of FIG. 8.

FIGS. 8 and 9 illustrate another bar 200 that can be used to connect the bond beam 130 to the ingot holder 110, and in turn the ingot 102 to the ingot holder. The bar 200 differs from the tee bar 150 in that it does not have a portion similar to the second portion 154 of the tee bar. (The bar 200 does not have a "T" shape.) The bar 200 has a pair of angled mating surfaces 202, 204 that form a portion of the uppermost surface of the bar. The mating surfaces 202, 204 intersect a centrally located flat surface 206. In other embodiments, the flat surface 206 may be omitted and instead the mating surfaces 202, 204 may intersect each other in a central portion of the bar 200.

The mating surfaces 202, 204 may be disposed at the same or similar angles as those of the mating surfaces 160 described above. Likewise, the mating surfaces 202, 204 serve the same or similar purpose as the mating surfaces 160 as described above. As best seen in FIG. 9, the bar 200 also has a plurality of openings 208 formed therein that serve the same or similar function as the openings 162 in the tee bar 150.

Figure 10:
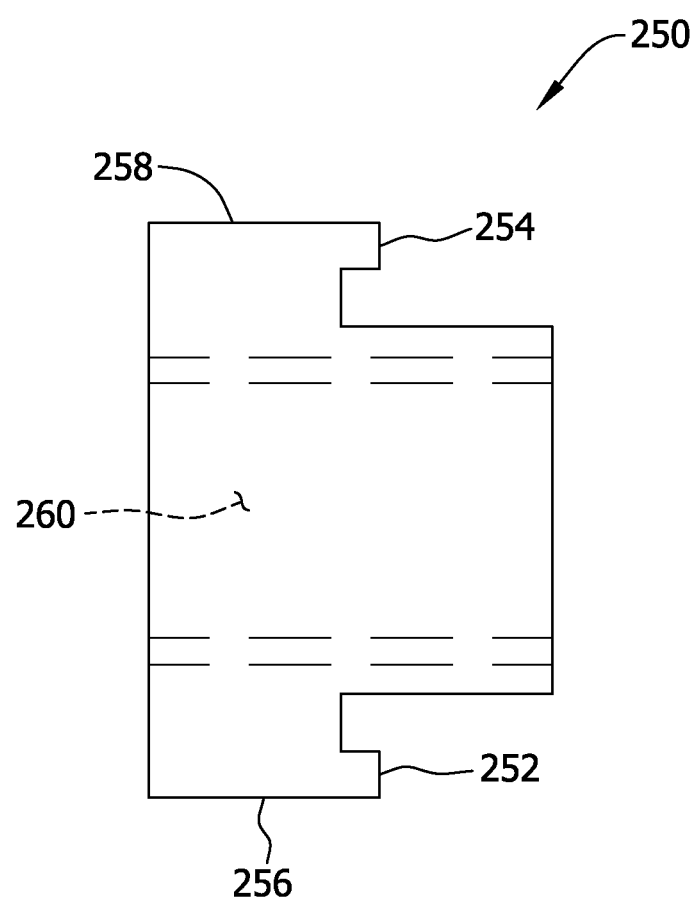
FIG. 10 is an end view of another embodiment of a tee bar used in the system of FIG. 1.
Figure 11:
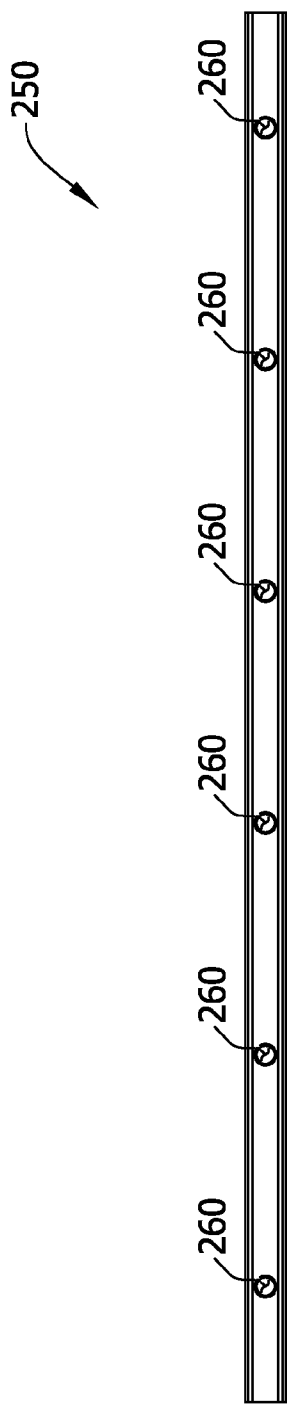
FIG. 11 is a top plan view of the tee bar of FIG. 9.

FIGS. 10 and 11 illustrate another tee bar 250 that can be used to connect the bond beam 130 to the ingot holder 110, and in turn the ingot 102 to the ingot holder. The tee bar 250 differs from the tee bar 150 and bar 200 in that it has a pair of protrusions 252, 254 extending from respective lateral portions 256, 258 of the tee bar. The protrusions 252, 254 serve a similar function as the mating surface 160 described above. That is, when the tee bar 250 is positioned in the slot 136 the protrusions 252, 254 engage the recessed surfaces 140 of the slot. The tee bar 250 also has a plurality of openings 260 formed therein, as best seen in FIG. 11.

Prior attempts to use tee bars to connect the bond beam to the ingot holder yielded unsatisfactory results. The tee bars used in these prior attempts had mating surfaces that were parallel to the recessed surfaces of the slots. Thus as the fasteners were tightened, the contact or engagement by the mating surface against the recessed surface displaced the protrusions of the bond beam in an upward direction, towards the ingot holder. In other words, the slots were "spread open" by the action of the mating surface against the recessed surface. The upward deflection resulted in the deflection of the second surface of the bond beam. This deflection in the second surface resulted in the second surface having an unacceptable flatness which compromised the adhesive bond between the bond beam and the ingot. Thus prior systems were unable to use tee bars to connect the bond beam to the ingot holder and were instead reliant on adhesive bonding to connect the two together.

Embodiments of the present disclosure solve the problem presented by the use of prior art tee bars having mating surfaces parallel to the recessed surfaces of the slots. In use, the angled mating surface 160 (or mating surfaces 202, 204) disclosed herein acts upon the recessed surface 140 of the slot 136 as the fasteners are tightened. The angle of the mating surface 160 (or mating surfaces 202, 204) with respect to the recessed surface 140 reduces or eliminates deflection of the protrusions 142 and prevents the slots 136 from being spread open. This reduction or elimination of deflection in turn reduces or eliminates deformation of the second surface 134 of the bond beam 130. Accordingly, the flatness of the second surface 134 of the bond beam 130 is not affected and the integrity of the adhesive bond between the bond beam and the ingot 102 is not compromised.

The protrusions 256, 258 of the tee bar 200 also serve a similar function as the angled mating surfaces. When in use, the protrusions 256, 258 act upon the recessed surface 140 of the slot 136 as the fasteners are tightened. The engagement of the protrusions 256, 258 and recessed surface 140 reduces or eliminates deflection of the protrusions 142 and prevents the slot 136 from being spread open.

The use of the disclosed tee bars 150, 250 and bar 200 provides a mechanical connection between the ingot holder 110 and the bond beam 130. The bond beam 130 and the ingot holder 110 may thus be quickly and efficiently connected before commencement of the slicing operation by the wire saw 103. The two may likewise also be separated at the conclusion of the slicing operation, as described above. The ingot holder 110 can thus be readily returned to service, as time-consuming and costly operations (i.e., such as those required in prior systems to separate adhesively bonded ingot holders and bond beams) are not required to separate it from the bond beam 130.

While reference is made herein to the mating surfaces 160 of the tee bar 150 (and the mating surfaces 202, 204 of the bar 200) being angled with respect to the recessed surface 140 and the recessed surface being parallel to the second surface of the bond beam, other configurations are contemplated in different embodiments. For example, in one embodiment the mating surface 160 of the tee bar 150 (or the mating surfaces 202, 204 of the bar 200) is parallel to the lower surface 156 of the tee bar. The recessed surface 140 of the slot, however, is angled with respect to the second surface 134 of the bond beam 130 (i.e., the two are not parallel). The magnitude of this angle may be the same as or similar to the range of angles disclosed above in regards to the angled mating surface 160 (or the mating surfaces 202, 204). In another embodiment, the mating surface 160 (or the mating surfaces 202, 204) is angled to some extent and the recessed surface 140 is also angled to some extent to achieve the desired effect of reducing or eliminating deflection of the second surface 134 of the bond beam 130.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the present disclosure, it is intended that all matter contained in the above description and shown in the accompanying drawings shall be interpreted as illustrative and not in a limiting sense.

What is claimed is:

1. A system for connecting an ingot to a rail of a wire saw machine, the system comprising:

an ingot holder connected to the rail of the wire saw machine and connected to the bond beam;

a bond beam having a first surface and an opposing second surface, the first surface connected to the ingot holder and having a slot formed therein, a pair of protrusions positioned adjacent the slot, the slot having an upward-facing recessed surface, the second surface connected to the ingot; and a bar disposed between the bond beam and the ingot holder, the bar having a mating surface engaging the recessed surface of the slot, wherein the mating surface is angled between about 5 degrees and about 10 degrees relative to the recessed surface when the bar is positioned within the slot, wherein the engagement of the recessed surface by the angled mating surface prevents deflection of the protrusions and the second surface.

2. The system of claim 1 wherein the bar has a first portion and a second portion, the first portion having a width greater than the second portion, wherein the mating surface is included in the first portion and the first portion has a lower surface opposite the mating surface.

3. The system of claim 2 wherein the mating surface and the lower surface are disposed in intersecting planes.

4. The system of claim 2 wherein the lower surface of the first portion of the bar is parallel to the recessed surface of the bond beam.

5. The system of claim 2 further comprising at least one opening formed in the ingot holder and at least one opening formed in the bar.

6. The system of claim 5 wherein the at least one opening in the bar is disposed in both the first portion and the second portion.

7. The system of claim 5 wherein the at least one opening formed in the ingot holder is coextensive with the at least one opening formed in the bar when the bar is in use.

8. The system of claim 5 wherein the at least one opening in the ingot holder and the at least one opening in the bar are sized for receiving a mechanical fastener.

9. The system of claim 1 wherein the bar has a length and the bond beam has a length, and wherein the length of the bar is substantially equal to the length of the bond beam.

* * * * *